United States Patent Office 3,549,732
Patented Dec. 22, 1970

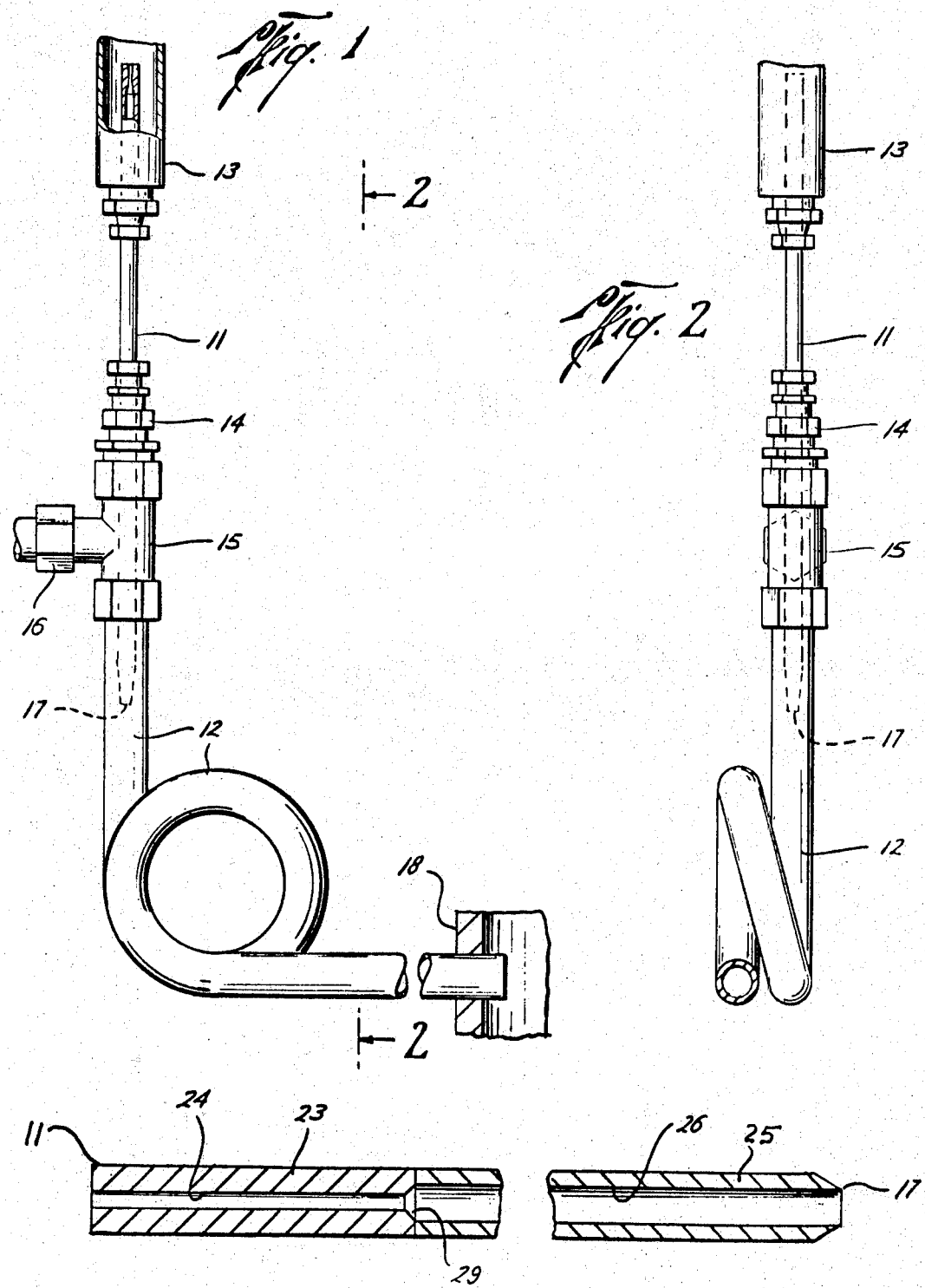

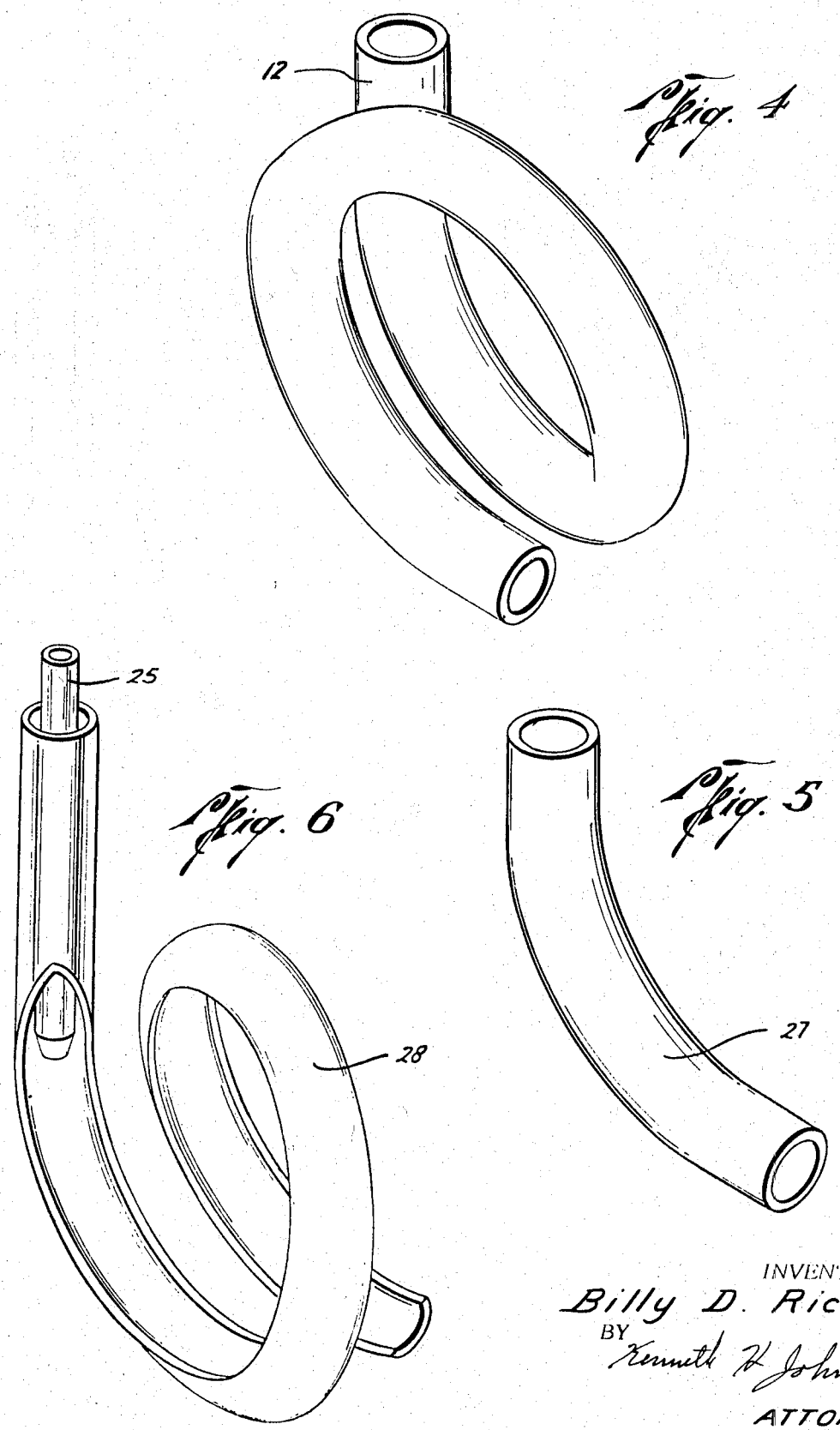

3,549,732
METHOD FOR SEPARATING A POLYMER FROM A SOLVENT
Billy D. Rice, Pasadena, Tex., assignor to Petro-Tex Chemical Corporation, Houston, Tex., a corporation of Delaware
Original application Sept. 17, 1965, Ser. No. 487,985. Divided and this application Sept. 3, 1968, Ser. No. 810,042
The portion of the term of the patent subsequent to Mar. 12, 1985, has been disclaimed
Int. Cl. B29b 1/02
U.S. Cl. 264—8                                   6 Claims

ABSTRACT OF THE DISCLOSURE

A method of separation of polymers from a solvent characterized by extruding the polymer at a positive pressure into an area of reduced pressure and impinging the polymer against an arcuate surface to achieve further separation by volatilization of the solvent and particulation of the filament.

---

This is a division of application Ser. No. 487,985, filed Sept. 17, 1965.

This invention generally relates to a novel method for separating and removing polymer from a polymer solution. In one of its aspects, this invention relates to a method for producing and separating solid polymer particles from a solvent, and particularly from a solvent in which the polymerization has occurred. In still another aspect, this invention relates to a novel method for producing and separating free-flowing polyolefin polymer particles having a high bulk density from a solvent containing the polyolefin.

During the production phase of a polymer such as polybutene, the polymer is generally formed in an appropriate organic solvent such as heptane, hexane, butane, butene-2, and the like. Generally, the polymer is present in the solvent as a solution. In order to produce a commercially useful polymeric material, it is necessary to extract the polymer from the solvent. It is important that this extraction step or recovery step be carried out in the most efficient manner possible because of the economics involved. In addition, it is important to obtain an end product which is not only free of solvent, but which is also relatively free of other low boiling contaminants. If the solvent or contaminants are not fully removed from the polymer, prior to extruding the polymer, the extruded polymeric material may contain bubbles or other imperfections. In addition, the entrapped solvent may generate combustible or explosive conditions when the polymer is extruded or if the polymer is stored for extended periods of time.

The prior art has utilized many methods for separating the polymer from the solvent. For example, the polymer has heretofore been removed from the solvent by precipitating it with alcohol and gravitationally separating out the polymer. One disadvantage of the precipitation method is that the polymer retains large quantities of the solvent and requires extended periods of high temperature drying to insure complete removal of the solvent.

Another method which has been used is spray drying. This technique is expensive and requires large drying equipment which normally cannot be conveniently installed in most manufacturing operations. Furthermore, spray drying is generally limited to dilute or low viscosity polymeric solutions and requires large volumes of heated gas such as air to effect complete drying of the polymer.

Another means which has been used is to flash or fractionate the solvent from the polymer solution. This technique generally requires the use of high temperatures which can result in a popcorn type polymer having a low bulk density and a broad range of particle sizes, making extrusion of the polymer difficult.

It is therefore an object of this invention to provide an improved method for separating polymer from a solution, which will overcome the shortcomings of the prior art noted above.

Another object of this invention is to provide an improved method for producing and separating solid polymer particles having an improved bulk density and uniform particle size.

Another object is to provide a process for producing polymer particles suitable for extrusion.

Still another object of this invention is to provide a method for producing and separating free-flowing solid polybutene polymer particles having a higher bulk density than that heretofore obtained from a solution of butene-1 polymer and butene-1 monomer.

Briefly stated, the apparatus for carrying out the instant invention herein includes a nozzle means for receiving the pressurized polymer solution and for extruding the solution to form a filament of polymer while partially volatilizing the solvent containg the polymer. Means are also connected to the nozzle means for receiving and subjecting the polymeric filaments to a force for particulating the polymer and for further volatilizing the solvent.

In carrying out the method of the instant invention, the polymer solution is normally introduced into the nozzle means at an elevated temperature and at a positive pressure. It is understood that the apparatus and method of this invention also contemplates the cooling of the end product. The pressurized polymer solution is then extruded into a lower pressure environment to thereby form the polymer into a filament and at the same time to partially volatilize the solvent. The polymeric filament is then subjected to a particulating force such as that obtained when the polymeric filament is impinged against an arcuate surface. This exterior force particulates said filament accompanied with further volatilization of said solvent. In some instances, a heated gas can be added as a preferred feature of the invention.

Reference to the drawings will further explain the invention wherein like numerals refer to like parts and in which:

FIG. 1 is a side elevation view of one embodiment of a novel separating apparatus of this invention.

FIG. 2 is a side elevation view taken at line 2—2 of FIG. 1.

FIG. 3 is a fragmentary enlarged cross sectional view of the nozzle assembly 11 shown in FIG. 1.

FIG. 4 is a partial isometric view of the discharge tube 12 shown in FIG. 1 and showing the looped section thereof.

FIG. 5 is an alternate embodiment of a means providing an impinging surface showing a tubular member defining an arc of about 90 degrees.

FIG. 6 shows an alternate impingement means in the form of a channel-shaped slide member defining an open loop of about 360 degrees.

Referring now to FIG. 1, the apparatus used in the invention is generally comprised of a nozzle assembly 11 at its upper end, which nozzle assembly discharges ultimately into an impingement means in the form of a curved arcuate discharge tube 12 defining a loop. The upper end of nozzle assembly 11 is connected by appropriate connectors to an appropriate upper chamber member 13, which is adapted to receive the pressurized polymer solution. It is to be understood that means (not shown) may be provided for pressurizing and heating the polymer solution to an elevated temperature and a positive pressure. Generally, though, the polymer solution will be in a heated condition and under positive pressure, such as at least 50 p.s.i.g., as the result of the production phase wherein the polymer is produced in a suitable solvent.

Nozzle 11 is also provided with a lower connector 14 at about midpoint thereof, which connector is attached to T-fitting 15 having inlet tube 16 connected thereto for the admission thereinto of a heated, pressurized gas such as heptane, butane or butene. The lower end of T-fitting 15 connects to the aforesaid discharge tube 12. It will be observed that the discharge tube 12 is of a larger cross sectional area than is the discharge orifice 17 at the lower end of nozzle assembly 11. Discharge tube 12 is in the form of a loop whereby filaments passing therethrough are subjected to an impingement action and a centrifugal force and are discharged into a convenient collection means such as cyclone receiver 18.

Referring now to FIG. 3, the details of nozzle assembly 11 will be described in greater detail. One important feature of the nozzle assembly is that it is provided with upper nozzle 23 which is adapted to initially receive the pressurized polymer solutions from a chamber member 13 as adapted to extrude the polymer solution therethrough in a controlled and uniform rate of flow. Nozzle 23 has an axial bore 24 therethrough which communicates with chamber member 13 and intermediate tube 25. Bore 24 and bore 26 is communicated by about a 45 degree smooth edge cut 29. If polymer particles of uniform size and bulk density are desired, the length of nozzle 23 should be at least 5 times the diameter of bore 24. The preferred relationship between the length of nozzle 23 and the axial bore 24 can be conveniently represented by a length-diameter ratio of between 8:1 and 50:1 and, preferably, of between 10:1 and 40:1, and still more preferably, a length-diameter ratio of between 12:1 and 30:1. With a length-diameter ratio as set forth above, the size of polymer particles, as well as the amount of residual solvent present in the polymer can be conveniently controlled. For example, if a polybutene-1 polymer solution is pressurized to about 150 p.s.i.g. and introduced into a nozzle assembly in which nozzle 23 has a length of about 1½ inches and axial bore 24 has a diameter of between 0.039 and 0.180 inch, uniform polymer particles of solid butene-1 can be obtained having a low bulk density. However, if under the same conditions the diameter of bore 24 is decreased to below 0.039 inch, dust-like polymer particles are produced which can be easily carried overhead with the solvent vapors causing separation and purification problems. If, on the other hand, the bore size diameter is increased to above 0.180 inch, filamentary and popcorn type polymer particles are produced which are generally less desirable for feeding into an extruder. It should be understood, however, that if dust-like particles having a diameter of between 10–40 microns are desired, the diameter of axial bore 24 can be at or even below 0.02 inch.

The lower end of nozzle 23 connects with the upper end of an elongated housing member in the form of intermediate tube 25, having an enlarged axial bore therethrough. The lower end of enlarged axial bore 26 forms the discharge orifice 17 referred to above.

While nozzle 23 and intermediate tube 25 have been described as integral units, it is to be understood that these members may be separate units, so long as they are held together in abutting coaxial alignment as shown. It is important, however, that enlarged bore 26 be of a larger cross sectional area than the cross sectional area of bore 24. Hence, when the pressurized polymer solution is extruded through bore 24 and into enlarged bore 26, the polymer solution is subjected to a lower pressure environment in bore 26. This permits the controlled expansion and volatilization of the solvent portion of the polymer solution and also permits the polymer to be cooled and extruded in the form of a solidified strand or filament.

In the usual operation, the polymer solution generally contains between about 5 to 40 percent by weight of the polymer and 60 to 95 percent solvent. Increased concentrations of polymer in the solvent may, however, be used if such increased concentrations do not inhibit a steady and continuous flow of polymer solution through the nozzle assembly. If, for example, solid butene-1 particles are to be separated from a solution of butene-1 polymer in butene-1 monomer, the concentration of butene-1 polymer in the monomer is adjusted, before introduction into the nozzle assembly, to a concentration of preferably between about 8 to 15 percent by weight of the total solution.

Upon passage of the solution out of bore 24 into bore 26, the solution is partially vaporized and a mixture comprising polymer solution, solvent vapor and solid polymer is present. As previously noted, bore 26 is of a larger diameter than bore 24. This is necessary to initiate vaporization of the liquid solvent and to accelerate the flow of the mixture through bore 26 and into tube 12. In other words, the diameter of bore 24 and the diameter of bore 26 must be such that the polymeric strands which are produced from the polymeric solution are accelerated to a velocity sufficient to cause particulation of the polymeric strands upon impingement against an arcuate surface. This relationship or ratio of diameter between bore 24 and bore 26 may be referred to as the "strand formation and particulating velocity ratio." When butene-1 polymer, for example, is dissolved in a solvent, or preferably when the butene-1 polymer is dissolved in its own monomer (butene-1), the diameter of bore 24 and the diameter of bore 26 is such that an acceleration to a velocity of between 30 feet per second to as high as 1000 feet per second is achieved prior to the point of impingement. An acceleration to a velocity of between 75 and 500 feet per second, for example, can be obtained when a pressurized 10 percent solution of butene-1 polymer in butene-1 monomer is introduced into a nozzle assembly in which bore 24 is approximately one-half of the diameter of bore 26. When the velocity at the point of impingement is significantly below 30 feet per second, particulation of the polymeric strands is incomplete and "snowballing" of the polymer may occur resulting in the retention of substantial amounts of solvent in the polymer. Such polymer is known as "wet" polymer and is normally unsuitable for extrusion. As the polymer velocity is increased to above 1000 feet per second, snowballing again occurs, although for different reasons. At exceptionally high velocities, it is believed that the particle sizes are decreased to a point where the centrifugal force exerted upon the particles is about equal to the force exerted on the solvent vapor, causing the particles and unvaporized solvent to pass through loop 12 at relatively the same velocity. Preferably, the velocity of the gas is maintained at a velocity greater than that of the polymer particles. This is accomplished by exerting a centrifugal force on the polymer particles greater than that exerted on the solvent vapor. This improves polymer drying and solvent vaporization and increases the polymer's bulk density. The proper velocity can be maintained by utilizing the nozzle assembly above described with a rate of acceleration therethrough of the polymeric particles of between 200 and 1500 feet per second per second, or more preferably an acceleration of between 400 and 750 feet per second per second.

In operation, the polymer solution containing the polymer is generally at a pressure of approximately 50 to 500 p.s.i.g. prior to introduction into the nozzle assembly. If the polymer solution is not already at this pressure the pressure may be achieved by conventional means. Generally, a pressure of at least 50 p.s.i.g. can be achieved by using a solvent having a vapor pressure above 50 p.s.i.g. under usual polymerization conditions. Solvents such as butane, butene, hexane, and the like, possess such a vapor pressure. For example, the polymerization of butene-1 in its own monomer at a temperature of about 80° C. will provide a polymeric solution for introduction into the nozzle assembly having a positive pressure of above 150 p.s.i.g. The polymer solution is then introduced into chamber member 13 in any convenient manner where it is extruded through nozzle 23 and into intermediate tube 25. As a result of this controlled expansion of the solvent, a strand or filament of pliable polymer is formed which has removed therefrom a large proportion of the solvent. The strand or filament extends outwardly during formation and it is discharged out discharge orifice 17 where it is subjected to further drying action and to certain impingement action, as will now be described.

The discharge rate of both the polymer and the volatilized solvent from orifice 17 of the intermediate tube will be such that the polymer is carried through the loop of discharge tube 12 and into cyclone separator 18. Upon discharge from orifice 17, the strand or filament of polymer is generally intact. Particulation and further drying thereof occurring during impingement and passage through the loop section of discharge tube 12. During passage through tube 12 the polymer particles are also subjected to a centrifugal force greater than that exerted on the solvent vapor. This force differential maintains the particles in particulate form during transit to and deposit in cyclone 18 and permits a more complete drying action during passage therethrough.

The polymer solution is normally introduced into the nozzle assembly by a carrying means such as pumps, pressurized feed in lines, and so forth, at an elevated temperature as a result of the production phase, and hence it is also important to cool the end product or the polymer particles. In addition, it is important to cause and maintain the passage of the polymer particles through the curved loop at an optimum velocity. Furthermore, it is important to avoid condensation of the previously volatilized solvent in the loop. To prevent or avoid the foregoing difficulties with respect to the loop of discharge tube 12, in some embodiments of the invention it is desirable to subject the filament of polymer as it is discharged from the discharge orifice 17 to a pressurized gas which is generally heated to a temperature which would facilitate the drying of the polymer particles. In addition, the heated gas further facilitates the movement of the polymer particles through the curved loop of discharge tube 12 and also minimizes the possibility of the solvent vapor condensing in discharge tube 12. This is provided by forcing a heated gas under pressure through tube 16 and into T 15 and then downwardly through discharge tube 12 past the discharge orifice 17. Any material capable of being volatilized at the temperature of introduction may be used. If a low boiling solvent is used in the polymerization reaction, such solvent can be vaporized and also used as the heated gas.

It will be observed that the loop of discharge tube 12 is a closed loop and provides an impingement surface for the polymer particles as described above. Referring now to FIG. 4, discharge tube 12 loop is shown in isometric perspective, and hence it may be said that the loop of tube 12 is a closed loop and defines an impingement surface of at least 360 degrees. However, it has been found that the impingement surface of the apparatus may take different forms in certain instances. For example, it has been found that in some embodiments, an arcuate surface defining a radius from about 30 degrees to 2500 degrees is satisfactory. Preferably, though, an arcuate surface defining a radius of at least 90 degrees or from 270 degrees to 1300 degrees is used. Such a discharge or impingement means is shown in FIG. 5 where alternate discharge tube 27 is shown. In this instance, tube 27 is a closed member and provides an arcuate surface of about 450 degrees for the impingement of the polymer thereagainst during passage downwardly therethrough. It is understood that tube 27 could also be an open channel, so long as the impingement surface is an arcuate surface such that the polymer particles passing therethrough are maintained at velocities for the purposes noted above.

In FIG. 6, intermediate tube 25 is shown discharging into an arcuate shaped impingement member in the form of an open channel member 28, similarly defining a loop of at least 30 degrees to about 810 degrees. Normally, such a channel member would be contained within a closed housing. The polymer and the volatilized solvent being discharged from the intermediate tube 25 will be of such velocity as to normally carry the polymer particles through the channel member 28 prior to discharge into an appropriate collection member such as cyclone 18. Although an open impingement means in the form of a channel member 28 is satisfactory in some instances, a closed discharge tube of relatively small diameter, such as tube 12 or tube 27 (shown in FIGS. 4 and 5, respectively), is preferred. A closed tube is preferred, particularly where a plurality of such tubes is used in a discharge into one collection means. If it should occur that one of the discharge tubes becomes fouled or otherwise inoperable, it can be removed without shutting down of the other discharge tubes which might be required if open loops were used. Moreover, by having a closed discharge tube, it may be easier to recover the solvent by appropriate condensation techniques and also control the amount of dusting which may be prevalent in the open channel type of member.

It will thus be observed that the art has been provided with a simple, yet economical means, for carrying out the so-called recovery phase of polymer production, i.e., the recovery or removal of the polymer from the solvent. The invention also provides a means for producing polymer particles of uniform size and high bulk density and of overcoming certain of the prior art shortcomings.

Various types of polymer particles may be produced and separated by the apparatus and process above described. Broadly speaking, though, any bulk polymer which can be dissolved in a solvent may be separated from the solvent and free-flowing particles produced therefrom. For example, solutions of the following polymeric materials can be used. Polymers of alpha-olefins or diolefins having the general formula, $R-CH=H_2$, wherein R preferably has from one to 12 carbon atoms and is an aromatic, aliphatic or cycloaliphatic radical, either saturated or unsaturated can be used. Halogen substituted polymers derived from halogen substituted alpha-olefins or halogenated polymers may also be used. Examples of the above polymers include polypropylene, polybutene, polybutadiene, polystyrene, polypentene, polyheptene, polyisobutylene, polyisoprene, poly(3-phenyl propene-1), poly(3 - phenyl butene - 1), poly(4 - phenyl butene-1), polybicyclo(2,2,1-heptene-2), polycyclopentadiene, neoprene, and the like. Mixtures and copolymers of the above may also be used.

This invention is particularly applicable to alpha-olefin polymers having from 3 to 14 carbon atoms per molecule of monomer and, more particularly, to alpha-olefins having from 3 to 8 carbon atoms. This invention is particularly well adapted to solutions of polymeric butene-1 in which the polymer has a specific gravity of at least 0.88 at 20° C. and preferably between 0.90 and 0.92, or higher, and a crystallinity of at least 10 percent and preferably a crystallinity of between 35 percent and 60 percent at ordinary atmospheric temperatures. A useful polymerization method for the production of polymers which can be used in the practice of this invention can be found in U.S. Pat. No. 2,825,721 issued on Mar. 4, 1958. According to this patent, polymers are obtained by polymerizing olefin compounds in the presence of chromium oxide associated with at least one oxide selected from the group consisting of silica, alumina, zirconia, and thoria. The polymers produced therefrom are characterized by the fact that their unsaturation is predominantly of the trans-internal or terminal vinyl type. Certain of the polymers are characterized in that their unsaturation is almost entirely of the terminal vinyl structure. In one embodiment of this patent, aliphatic olefins containing 2 to 8 carbon atoms are polymerized in the presence of a hydrocarbon diluent which is inert and in which the polymer is soluble. Aliphatic, cycloaliphatic or aromatic type hydrocarbons may be used as the diluent. The reaction is ordinarily conducted at a temperature up to about 500° F. and preferably between 150° F. to 320° F. under a pressure sufficient to maintain the reactants and diluents in the liquid state. The reaction is carried out with a catalyst comprising chromium oxide supported on a carrier such as silica, alumina, zirconia, and so forth. The catalyst is obtained by impregnating a silica-alumina complex with an aqueous solution of a chromium compound convertible to chromium oxide upon heating and calcining same under non-reducing conditions such as in the presence of air, oxygen, $CO_2$, etc., at a temperature in the range of 750° F. to 1500° F., whereby the chromium compound is converted to chromium oxide in which the chromium is in the hexavalent form. The chromium oxide is present in an amount of at least 0.1 weight percent based on the weight of the total catalyst. The temperature which can be used to carry out the polymerization reaction can vary over a broad range, but normally ranges from 100° F. to 500° F. and preferably ranges between 150° F. and 450° F. The preferred range for propylene and higher olefins is 150° F. to 250° F. when a fixed bed catalyst is used. When a mobile catalyst is used, the preferred polymerization temperature for propylene or higher olefins is about 180° F. to 200° F.

The polymerization process described above is preferably maintained at a pressure high enough to maintain a liquid phase reaction. Normally a pressure of at least 100 p.s.i. to 300 p.s.i. is required. However, pressures as high as 500 p.s.i. or even 700 p.s.i. can be used, if desired. As a general rule, higher pressures favor the production of high molecular weight polymer with all other conditions being constant. Molecular weights of propylene of between 2,000 and 50,000 can be obtained by utilization of the above described conditions. The feed rate can range from 0.1 to 20 liquid hourly space velocities in a liquid phase process with a fixed bed catalyst.

Hydrocarbon diluents, preferably paraffin and/or cycloparaffins, serve as solvents for the polymer products. Among the more useful solvents are the acyclic paraffins having from 3 to 12, and preferably 4 to 8, carbon atoms. Any hydrocarbon diluent which is relatively inert, non-deleterious and liquid under reaction conditions can be utilized. The heavier paraffin diluents generally have a higher solvent power for the polymer than do the lighter ones. The lighter paraffins possess many characteristics which are particularly advantageous if the polymeric solution is to be introduced directly from the reaction vessel into the apparatus as described in the instant invention. It is understood, however, that in most all instances the catalyst is first removed from the polymeric solution.

The polymerization can be effected with a fixed bed catalyst or with a mobile catalyst. A frequently preferred method of conducting the polymerization reaction comprises conducting the feed olefin with a slurry of the comminuted chromium oxide catalyst in suspension in the diluent or solvent. From about 0.001 weight percent of catalyst based on the weight of the diluent is ordinarily used. The catalyst can be maintained in suspension by a mechanical agitation device and/or by virtue of the velocities of the incoming feed or diluent.

Where the polymer is obtained as a slurry, the polymer can be separated from the catalyst by dissolution in a solvent of the type above described usually with the aid of heat and agitation. The stripping catalyst can then be recycled and, if necessary, can be regenerated. The regeneration can be accomplished by oxidizing the residual carbonaceous deposit with a controlled concentration of oxygen in an inert gas by conventional procedures.

Another highly advantageous process which may be employed for obtaining the polymeric solutions used in the apparatus and process of the instant invention requires the use of a different type catalyst. For example, polymers can be prepared in the presence of polymerization catalysts which are generally known as "Ziegler" type polymerization catalysts. A complete description of some of the catalysts which may be utilized can be found in the Ziegler et al. patent, U.S. 3,113,115, issued on Dec. 3, 1963. The Ziegler et al. patent discloses the mode of preparing a polymerization catalyst from a transitional metal compound, preferably a halide, and a reducing component consisting normally of a metal alkyl compound. Representative of a transitional metal compound which may be used include those selected from Groups IV-B, V-B and VI-B of the Periodic Table. Included in the preferred species are the titanium halides, for example, titanium tetrachloride, titanium trichloride, and titanium dichloride, and mixtures thereof. Other metal compounds, such as zirconium tetrahalide, hafnium tetrachloride, vanadium chloride, chromium chloride, tungsten chloride, and the like, are especially useful. Still other transitional metal halides containing halogens selected from the group consisting of bromine, iodine, chlorine, and, in certain instances, fluorine, can also be used.

The reducing component of the Ziegler catalyst composition may be any of a variety of reducing agents. Most common among the reducing agents are organometallic compounds such as triethyl aluminum, aluminum diethyl chloride, aluminum diethyl hydride, aluminum triisobutyl, aluminum triisopropyl, and related compounds. Many other reducing agents, such as lithium aluminum hydride, zinc diethyl hydride, and the like, are described in the literature as useful reducing agents and can also be used. These catalysts are of the now well-known "Ziegler" variety.

In the catalytic complex comprising a transitional metal compound and a reducing component, the ratio of constituents may be varied over a relatively broad range. The preferred range depends to a large extent on the operating conditions, the hydrocarbon to be polymerized, and the choice of catalyst to be used. In a catalyst where one mol of titanium halide is used, the triethyl aluminum compound may be varied from about 0.5 to 5 mols or even 10 mols. In using the above catalyst, a number of procedures may be employed. For example, the catalyst complex may be pre-formed and pre-activated prior to combining the complex with the hydrocarbon feed. In another technique, the catalyst may be combined in an inert solvent and this slurry added to or combined with the hydrocarbon feed. In some instances, the catalyst components may be added directly to the hydrocarbon feed. The polymerization reaction is generally conducted in the presence of an inert organic solvent or in the presence of an excess of monomer. While the catalyst may be prepared at temperatures of a wide range, the catalyst will usually be prepared at a temperature between 30° C. and 150° C. The amount of catalyst may be varied quite widely and may be as low as 0.01 weight percent based on the weight of the monomer to be polymerized, but normally will be in the range of about 0.5 to about 5-10 weight percent. The polymerization reaction is normally conducted at temperatures below 250° C. and at pressures below 300 atmospheres and usually at temperatures of between 25° C. and 150° C. and at about 1-50 atmospheres.

The polymeric reactions may be conducted in bulk, but usually will be in an inert diluent. Preferred are the inert liquid hydrocarbons, the alkanes, such as propane, butane, pentane, heptane, and the like; however, such materials as isooctane, cyclohexane, benzene, toluene, and the like, are also useful. The polymer formed by the above described processes may then be solidified in free flowing particulate form with a high bulk density by utilization of the apparatus and process of this invention after stopping the polymerization by deactivating the catalyst as with an alcohol.

Still more specifically, a patent by Natta et al., U.S. 3,141,872, issued on July 21, 1961, describes in detail a preferred technique directed primarily to the production of polypropylene. According to the Natta et al. patent, polymerizates of unsaturated hydrocarbon, and particularly propylene consisting substantially of isotactic macromolecules, can be obtained by using a solid crystalline titanium halide in which the titanium has a valence lower than the maximum valence corresponding to its position on the Periodic Table. The polymerization catalyst is prepared from the powdery (crystalline solid) titanium trichloride suspended in a hydrocarbon and adding thereto a metal alkyl compound, such as triethyl aluminum or diethyl aluminum mono-chloride, and subsequently heating the suspension to a temperature of from 50° C. to 90° C. By this process, a catalyst is obtained which permits control of the polymerization of unsaturated hydrocarbons, so that polymers which are produced are substantially made up of isotactic macromolecules. The polymerization of propylene, according to Natta et al., is carried out in a liquid diluent which is substantially inert to the metal alkyl or alkyl metal chloride in the substantial absence of air and water and preferably is conducted under an atmosphere of an inert gas such as nitrogen.

The hydrocarbon solvents which may be used in preparing the catalyst and which can be used as the polymerization media are preferably paraffinic hydrocarbons including a light gasoline, heptane, isooctane, and the like. The hydrocarbon solvent may also be the monomer to be polymerized. The polymerization may be carried out at temperatures between 20° C. and 120° C. under atmospheric pressures or low pressures up to 30 atmospheres above normal atmospheric pressure.

In another patent to Seelbach et al., U.S. 2,964,510, issued Dec. 13, 1960, the polymerization of butene-1 is described. According to this patent, the polymerization is conducted with a catalyst which is a complex or reaction product of an alkyl metal compound, such as diethyl aluminum chloride or aluminum sesquichloride (an equal molar mixture of aluminum diethyl chloride and aluminum ethyl dichloride) with a compound of titanium, e.g., titanium tetrachloride.

The temperature to be used in carrying out this polymerization is generally about 25° C. to 35° C. with a pressure of between one and 100 atmospheres, preferably about 800 p.s.i.g. It is preferable to carry out the polymerization in the presence of a substantial amount of liquid diluent which may be an inert aliphatic hydrocarbon preferably having about 6 to 20 carbon atoms or various aromatic hydrocarbons or other inert solvents. The polymerization reaction may also be conducted in the absence of a solvent, i.e., in the presence of only butene-1.

Although any desired method of contacting the butene with the catalyst may be used, a preferred method is to pass the olefin as a gas or vapor or even as a liquid into the catalyst slurry with good agitation. Polymerization occurs and continues at a rate which varies somewhat according to the nature of the polymerization feed, the catalyst, and relative concentrations of both the feed and catalyst in respect to the amount of diluent present.

In preparing the catalyst, the preferred procedure is to make a solution of the desired alkyl metal compound in a suitable solvent, such as n-heptane, and make a separate solution of titanium tetrachloride, also in an inert solvent such as n-heptane, and then mix the two solutions in the desired proportions at room temperature. The mixture of these two catalyst components generally causes the formation of a precipitate which is desirably kept in suspension by agitation. According to Seelbach et al., the mol ratio of the aluminum compound to the titanium compound in the catalyst mixture is generally about 6 mols of aluminum per mol of titanium. If solid high molecular weight insoluble polymer is desired, diethyl aluminum chloride is normally used. However, if lower molecular weight polymer is desired, then the sesquichloride is normally used.

In still another patent, U.S. 3,008,945, issued Nov. 14, 1961, to Saltman, a catalyst and process is described for the preparation of 1,4-transpolyisoprene. According to this patent, isoprene is polymerized to form 1,4 addition, transconfiguration polyisoprenes in the presence of a catalyst comprising an aluminum alkyl, titanium tetrachloride and ferric chloride. In general, isoprene is polymerized in the presence of the aforementioned catalyst system while the isoprene is dissolved in an inert solvent or diluent. The use of inert solvents or diluents provides a means for controlling the heat of reaction and thereby does not directly affect the rate of polymerization. The solvent-monomer ratio employed can be varied over comparatively wide limits, for instance, from as low as 1:2:1 or up to 20:1 or more. The temperature employed in the polymerization of monomeric isoprene may be varied broadly between a low temperature such as 0° C. up to a temperature of 90° C. or more. Preferably, the polymerization temperature is approximately 50° C. at a pressure of below 100 atmospheres. The preferred molar ratio of aluminum/titanium/iron is 10/1/5. The aluminum alkyl portion of this catalyst may be any alkyl radical such as aluminum triethyl, aluminum trihexyl, aluminum triheptyl, aluminum tripropyl, aluminum triisobutyl, and the like. Of these, aluminum triisobutyl is preferred. Preferably, the amount of catalyst consists of 2.8 parts by weight per 100 parts of monomer.

As is indicated by the prior art, various type solvents may be used as a vehicle for the polymerization reaction. If the polymer is already in solution, such solution may, in most instances, also be used in the apparatus and process heretofore described. However, certain solvents possessing certain properties are particularly useful and are more readily adapted for use in the process and apparatus of this invention. Generally, a solvent having a vapor pressure below 30 atmospheres at 20° C. is employed. Preferably, the solvent will have a boiling point above −50° C. and below 70° C. However, a solvent having a boiling point to about 150° C. can also be used, if desired. A solvent having a boiling point between −10° C. and 30° C. and a vapor pressure of between 10 and 50 atmospheres at 20° C. and having from 3 to 10 or 3 to 6 carbon atoms is still more preferred. Examples of suitable solvents include propane, propylene, n-butane, isobutane, butene-1, butene-2, pentane, pentene, isopentene, hexene, hexane, cyclohexane, heptane, heptene, and methylchloride. However, other aromatic, aliphatic or cycloaliphatic solvents can be used. A polymer's own monomer can also be used to advantage as a solvent.

Where the polymer is polybutene-1, suitable organic solvents include those selected from the group consisting of propane, butane, isobutane, butene-1, butene-2, and mixtures thereof.

Where the polymer is polypropylene, suitable organic solvents include solvents selected from the group consisting of propane, propylene, isobutane, butane, butene-2, and mixtures thereof.

Where the polymer is polyisoprene, suitable organic solvents include solvents selected from the group consisting of propane, butane, isobutane, butene-2, pentane, pentene-2, 2-methyl butene-2, and mixtures thereof. Polymeric solutions comprising polybutene-1 in butene-1, polypropylene in propylene, polycisbutadiene in butadiene, polyisoprene in isoprene, polystyrene in styrene, and the like, are particularly adaptable to use in the instant invention.

Normally, the polymer solution is introduced into the nozzle assembly of this invention under conditions which will permit unhampered flow of the polymeric solution through the nozzle means into an area of reduced pressure. Generally, this unhampered flow can be achieved by introducing the polymeric solution into the nozzle means at a temperature of between 20° C. and 200° C. and under a positive pressure. Under special circumstances, temperatures above 200° C. can be used. Solution temperatures of between 35° C. and 90° C. are, however, more generally used.

Although the polymeric solution is normally introduced into the nozzle means at a pressure greater than 50 p.s.i.g., pressures as low as 20 p.s.i.g. to as high as 2000 or even 3000 p.s.i.g. may be used, if desired. Generally, the polymeric solution is maintained at a pressure between 50 p.s.i.g. and 500 p.s.i.g. To a large degree, the choice of temperature and pressure to be used will be determined by the particular solvent in which the polymer is dissolved, the concentration of polymer in the solvent, the rate at which the polymer solution is to be introduced through the nozzle means and into the area of reduced pressure, and so forth.

Variations in any of the above conditions either directly or indirectly affect the rate of vaporization of the solvent. This rate of vaporization in turn controls the velocity of the polymeric strand at the point of impingement. As previously stated, the size of the polymeric particle is determined by the velocity of the polymeric strand at the point of impingement. It can therefore be seen from the above that the operating conditions can be varied over a rather broad range, depending on the size of polymer particles desired, the concentration of polymer in the solution, the type of polymer and solvent employed, and so forth. However, in all situations, it is important and vital to the operation of this invention that the polymer be separated from the solution as polymeric strands and, further, that these polymeric strands be accelerated to a velocity sufficient to cause particulation at the point of impingement. Almost any combination of operating conditions which will accomplish these particular results may be used.

A better understanding of the invention may be obtained by referring to the following illustrative example which is not intended, however, to be unduly limitative of the invention.

EXAMPLE 1

A nozzle assembly (see FIG. 3) comprising an upper nozzle having a bore diameter of 0.062 inch and a length of 1.5 inches and an intermediate tube having a diameter of 0.125 inch and a length of 10.5 inches was connected to a coiled tube as shown in FIG. 1. The recovery system, including the nozzle assembly, utilized in this example was essentially the same as that shown in FIG. 1 of the drawing. The upper nozzle had a length-diameter ratio of about 25:1. The coiled portion was joined to the nozzle assembly by T 15 through which additional butene-1 vapor was added. The coiled portion had a straight section of approximately 8 inches and a coil of approximately 450 degrees, forming a coil radius of 1.6 inches. The exit portion of this coiled member was then joined with a cyclone receiver 18 in which the polymer particles were collected. All connections were made with suitable vapor tight fittings. The cyclone receiver was mounted vertically on a horizontal drying unit which in turn was connected to the extruder feed hopper. The cyclone receiver was jacket-heated and maintained at a temperature of about 71° C. Butene vapor recovery lines leading back to the reaction system were connected to the cyclone receiver. Suitable temperatures and pressures were maintained by introducing heated (116° C.) butene-1 vapors through T 15 and into the nozzle assembly.

A butene polymer solution was prepared by adding 20 pounds of butene-1 monomer to a catalyst complex which was prepared by combining 0.109 mol of diethyl aluminum chloride to 0.072 mol of $TiCl_4$. The butene catalyst mixture was thoroughly agitated and heated to a temperature of about 100° C. at a pressure of about 300 p.s.i. After about 20 percent of the monomer had reacted, the reaction was stopped and the reactor cooled to room temperature. The polymer solution was then washed with water to remove the catalyst. A portion of the polymeric solution was tested and was found to have a molecular weight of between about 30,000 and 100,000. The remaining portion of the polybutene solution was diluted to a concentration of 12 percent by the addition of butene-1 monomer and introduced into the nozzle assembly through upper chamber 13 at a temperature of 80° C. and under a pressure of about 300 p.s.i.g. The polymer solution was metered into the nozzle assembly at a constant rate of about one gallon per minute. As the butene-1 polymer solution passed through the upper nozzle into the intermediate tube, the butene-1 monomer was vaporized and the polymer was extruded as a continuous strand or filament, which was then impinged against the wall of the coiled member at approximately a 45-degree angle. The velocity of the polymeric strand at the point of impingement was in excess of 300 feet per second. As the polymer strand was impinged against the coiled or arcuate member, the strand was broken into small uniform particles and passed through the arced member unit where further devolatilization and drying occurred. The particles were separated from the butene-1 vapors in the cyclone receiver. A portion of the butene-1 vapors was then returned to the polymerization system and a portion was reheated for introduction into the nozzle assembly. The polymeric particles were then removed from the cyclone receiver and were eventually fed into the extruder. The polymer particles collected in the cyclone receiver had a constant size of between 0.1 to 0.2 inch in diameter. These particles were free flowing and had a relatively high bulk density. The extruded polymeric products had no visibly detectable bubbles or other visible imperfections. The physical properties of the extruded polymeric product were determined to be as follows:

Melt index at 190° C. _____ 1.28
Density _____ 0.916
Yield strength, p.s.i. _____ 2440
Ultimate strength, p.s.i. _____ 3300
Hardness (Shore D) _____ 68
Elongation percent _____ 250

The pelletized product obtained therefrom was fabricated into a blown film, using conventional film blowing equipment. No film imperfections or differences in film strength were noted in polymer particles obtained by the process heretofore described. In other test runs, stabilizers were added to the polymer solution before the polymer is recovered and before all the butene-1 solvent had been removed. These runs lasted for periods in excess of 48 hours with a steady state of conditions being maintained throughout the polymerization and separating process.

Example 1 was repeated using various polymeric velocities at the point of impingement. The effect that these different velocities had on the polymeric particles is shown in Table I below:

TABLE I

| Run | Polymer velocity, ft./sec. at point of impingement | Particle size diameter |
|---|---|---|
| A | 300 | 0.1 inch to 0.2 inch. |
| B | 5 | 0.4 inch to 6 inches. |
| C | 1500 | 0.001 inch to 4-5 inches. |

EXAMPLE 2

Example 1 was repeated. The bulk density of the polymeric product produced therefrom was compared with the bulk density of polymer obtained by other means used in the art.

| Run | Means of separating polymer | Bulk density |
|---|---|---|
| D | Flashing | 5.0 |
| E | Precipitation and drying | 3.0 |
| F | Spray drying | 3.6 |
| G | Apparatus used in Example 1 | 10.6 |

EXAMPLE 3

In this example, a 12 percent by weight solution of isotactic polypropylene in propylene monomer is introduced into the nozzle assembly, as described in Example 1 and shown in FIG. 3 of the drawing, at a temperature of between 100° C. and 105° C. and at a pressure of 1000 p.s.i.g. The propylene solution is extruded from the nozzle assembly as a polymeric filament and accelerated, in the area of reduced pressure, to a velocity sufficient to cause particulation of the polymeric strand at the point of impingement. The polypropylene particles which are obtained are of constant size and of high bulk density.

EXAMPLE 4

In this example, a 15 percent by weight solution of crystalline polycisbutadiene in butadiene monomer is introduced into the nozzle assembly, as described in Example 1 and shown in FIG. 3 of the drawing, at a temperature of between 75° C. and 80° C. and at a pressure of about 500 p.s.i.g. The polycisbutadiene solution is extruded from the nozzle assembly as a polymeric filament and accelerated, in the area of reduced pressure, to a velocity sufficient to cause particulation of the polymeric strand at the point of impingement. The polycisbutadiene particles which are obtained are of constant size and of high bulk density.

EXAMPLE 5

In this example, a 12 percent by weight solution of polystyrene in styrene monomer is introduced into the nozzle assembly, as described in Example 1 and shown in FIG. 3 of the drawing, at a temperature of between 158° C. and 163° C. and at a pressure of about 500 p.s.i.g. The polystyrene solution is extruded from the nozzle assembly as a polymeric filament and accelerated, in the area of reduced pressure, to a velocity sufficient to cause particulation of the polymeric strand at the point of impingement. The polystyrene particles which are obtained are of constant size and of high bulk density.

Repeating the above examples under conditions optimum for solutions of polyisoprene in isoprene, polyvinyl chloride in vinyl chloride, and neoprene in chloroprene results in polymeric particles having a constant size and a high bulk density.

I claim:
1. The method of forming solid polymer particles from a solution of a soluble polymer and solvent comprising extruding said solution at a pressure of 20 p.s.i.g. or greater into an area of reduced pressure with respect to said pressurized polymer solution to thereby form said polymer into a filament and to partially volatilize said solvent, accelerating said polymeric filament to a velocity of between 30 to 1000 feet per second, and impinging said filament against an arcuate surface defining at least a 30 degree arc to thereby particulate said polymeric filament into particles having a high bulk density and uniform particle size, said velocity at the point of impingement being between 30 to 1000 feet per second.

2. The method as claimed in claim 1 wherein said arcuate surface defines an arc of at least 45 degrees.

3. The method of claim 1 wherein a heated gas is introduced in the area of reduced pressure to further volatilize said solvent and to maintain the velocity of said filament.

4. The method of claim 3 wherein said introduced heated gas is pressurized.

5. The method as claimed in claim 1 wherein said arcuate surface defines a curve of about 360 degrees, whereby said polymer is subjected to a centrifugal force, thereby forming polymeric particles of substantially uniform size and having a high bulk density.

6. The method of claim 1 wherein said solution is extruded at a pressure between 50 and 500 p.s.i.g., and said arcuate surface defining at least a 90 degree arc.

References Cited
UNITED STATES PATENTS 3,373,235  3/1968  Rice _____ 264—143

ROBERT F. WHITE, Primary Examiner

J. R. HALL, Assistant Examiner

U.S. Cl. X.R.

264—143

PO-1050
(5/69)

UNITED STATES PATENT OFFICE
CERTIFICATE OF CORRECTION

Patent No. 3,549,732          Dated December 22, 1970

Inventor(s) Billy D. Rice

It is certified that error appears in the above-identified patent and that said Letters Patent are hereby corrected as shown below:

Line 42, col. 6, "$R-CH=H_2$" -- $R-CH=CH_2$ --

Signed and sealed this 11th day of January 1972.

(SEAL)
Attest:

EDWARD M. FLETCHER, JR.        ROBERT GOTTSCHALK
Attesting Officer              Acting Commissioner of Pate